(12) United States Patent
Fournier et al.

(10) Patent No.: US 6,877,986 B2
(45) Date of Patent: Apr. 12, 2005

(54) ELEMENT WITH EXPANSIBLE RELIEF

(75) Inventors: Raymond Fournier, Gohetz-le-Chatel (FR); Alain Riwan, L'Hay les Rojes (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 10/312,489

(22) PCT Filed: Jun. 20, 2001

(86) PCT No.: PCT/FR01/01926
§ 371 (c)(1),
(2), (4) Date: Jul. 18, 2003

(87) PCT Pub. No.: WO01/99086
PCT Pub. Date: Dec. 27, 2001

(65) Prior Publication Data
US 2004/0029082 A1 Feb. 12, 2004

(30) Foreign Application Priority Data
Jun. 21, 2000 (FR) .............................. 00 07928

(51) Int. Cl.[7] .......................... G09B 21/00; G09B 21/02
(52) U.S. Cl. ...................... 434/112; 434/113; 434/114
(58) Field of Search ............................... 434/112, 113, 434/114, 115, 116, 117; 60/527

(56) References Cited

U.S. PATENT DOCUMENTS

| | | | | |
|---|---|---|---|---|
| 4,691,516 A | * | 9/1987 | Fornasari | 60/527 |
| 5,165,897 A | * | 11/1992 | Johnson | 434/113 |
| 5,509,269 A | * | 4/1996 | Kuze | 60/527 |
| 5,685,721 A | | 11/1997 | Decker | |
| 5,766,013 A | * | 6/1998 | Vuyk | 434/114 |
| 6,354,839 B1 | * | 3/2002 | Schmidt et al. | 434/113 |
| 2004/0038186 A1 | * | 2/2004 | Martin et al. | |

FOREIGN PATENT DOCUMENTS

| | | | | |
|---|---|---|---|---|
| EP | 0 663 633 A2 | | 7/1995 | |
| FR | 2 577 998 | | 2/1986 | |
| JP | 06004021 A | * | 1/1994 | ........... G09B/21/00 |

OTHER PUBLICATIONS

International Search Document PCT/FR01/01926, filed Jun. 20, 2001.
Kawai, "Interactive Tactile Display System—A Support System for the Visually Disabled to Recognize 3D Objects", Assets, Annual ACM Conference on Assistive Technologies, pp. 45–50 (Apr. 11, 1996).
Way, Thomas P. et al., "Automatic Visual to Tactile Translation—Part I: Human Factors, Acess Methods, and Image Manipulation", IEEE, vol. 5, No. 1, pp. 81–94 (Mar. 1, 1997).

* cited by examiner

Primary Examiner—Derris H. Banks
Assistant Examiner—Dmitry Suhol
(74) Attorney, Agent, or Firm—Thelen Reid & Priest, LLP

(57) ABSTRACT

An element (10) comprises sealed cavities (24) arranged according to a regular pattern. Each cavity (24) contains a product such as a wax which changes in volume, in reversible fashion, when a given temperature threshold is crossed, together with an individual heating organ (26). The cavities (24) are separated from the front face (10a) of the element by a mobile or deformable organ (38). A separate piloting for each of the heating organs (26) makes it possible to make the relief of the front face (10a) of the element evolve in controlled fashion. Such an element can be used to re-transcribe, in relief, tactile (visually handicapped) or visual information.

11 Claims, 2 Drawing Sheets

ELEMENT WITH EXPANSIBLE RELIEF

CROSS-REFERENCE TO RELATED APPLICATION

This application claims priority based on International Patent Application No. PCT/FR01/01926, entitled "Element With Evolutive Relief" by Raymond Fournier and Alain Riwan, which claims priority of French application no. 00 07928, filed on Jun. 21, 2001, and which was not published in English.

TECHNICAL FIELD

The invention relates to an element with one front face presenting an evolutive relief, enabling it in particular to re-transcribe tactile or visual information in relief.

The element relating to the invention can be used in many domains. Among the possible applications, one can cite, in particular, the production of Braille reading systems for the visually handicapped or the production of computer interfaces such as elements able to reconstitute the texture of objects or materials, within the framework of electronic commerce. Mention can also be made of transparent screens in relief able to be superposed on normal visualisation screens.

STATE OF THE ART

As shown, in particular, by documents FR-A-2 577 998 and EP-A-0 663 633, it is known how to use wax actuators to control various organs (valves, distributors, etc.) in household appliances such as refrigerators, freezers, dish-washers or clothes-washers. These wax actuators are present in the form of a jack, in which the movement of the mobile shank forming a piston is controlled by the variation in volume of a wax sealed in a hermetic cavity. This change in volume is due to a change in state of the wax, generally between a solid state and a liquid state, produced by crossing a predetermined temperature threshold. The change in state of the wax is generally produced by heating the wax, to make it pass from the solid state to the liquid state. The phenomenon is reversible.

Waxes suitable for use in this type of actuator are sufficiently numerous to allow the fusion point to be adjusted at will. By using normal waxes, the increase in volume produced by the change of phase is of the order of 10 to 15%. The use of special waxes even makes it possible to achieve increases in volume exceeding 20%.

Wax actuators have the advantage of very low production costs. Furthermore, they can produce big changes for very significant displacements.

The essential disadvantages of present wax actuators relates to their relatively long response time, due to their thermal inertia.

Moreover, elements are known with evolutive relief, mainly used in Braille reading systems for the visually handicapped. In these elements, magnetic or piezoelectric actuators are generally used, arranged according to a pattern, to make the relief of the front face of the element develop in function of the information to be transmitted.

These existing elements have the disadvantages of being relatively expensive and of being of limited dimensions. Furthermore, the use of magnetic or piezoelectric actuators provides them with low resolution. In other terms, the texture of the relief obtained is relatively rough. Finally, with these actuators one cannot envisage the production of transparent screens in relief able to re-transcribe visual information, associated with traditional visualisation screens.

DESCRIPTION OF THE INVENTION

The precise aim of the invention is an element with evolutive relief without the disadvantages of existing elements and with an original design allowing it, in particular, to be able to benefit from large dimensions, an especially high resolution, and enabling the production of transparent elements usable on normal visualisation screens, at very low cost.

According to the invention, this result is obtained by means of an element with a front face with evolutive relief, said element being characterised in that it comprises sealed cavities, distributed according to a regular pattern and filled with a product able to change volume when a predetermined threshold temperature is crossed, a deformable or mobile organ separating each cavity of the front face, individual heating means for the product contained in each cavity, and control means able to pilot all the individual heating means of the element separately.

The layout in the element of a matrix of devices comparable to the wax actuators used in prior art in household appliances and the separate piloting of each of these devices makes it possible to obtain the results announced. In particular, an element designed in this way is especially low in cost, is not limited in size and implements technologies very suitable for miniaturisation and, consequently, enables the production of very high definition elements for representing textured surfaces.

Moreover, the use of a transparent product and transparent materials makes it possible to produce an element in relief, also transparent. Such an element can be superposed on a traditional visualisation screen for re-transcribing visual information in relief.

Parallel to this latter application, the element according to the invention can be applied, more classically, to transcription in relief of tactile information. Thus it is possible to produce Braille reading systems for the visually handicapped, computer interfaces, or elements capable of reconstituting the texture of objects or materials for electronic commerce applications.

In the preferred embodiments of the invention, the heating means are heating organs piloted by an electric current. The control means are thus connected to these heating organs by electrical conductors with a matrix layout.

Depending on the case, the electrical conductors can either cross a rear wall, preferably rigid, of the element or be supported by a substrate, preferably rigid, such as a printed circuit on which the rear face of the element is formed.

In a first embodiment according to the invention, the cavities are defined by perforations formed in a plate, preferably rigid.

In this case, the deformable or mobile organ comprises either a piston able to slide in each perforation of the front face side of the element, or an elastic membrane covering the rigid plate of the front face side of the element, in such a way as to close the perforations hermetically. In the former case, a recall means can be associated with each piston, to bring it back automatically to rest position, when the product contained in the corresponding cavity has cooled.

In a second embodiment according to the invention, the cavities are defined integrally within an elastic membrane with one front face forming the front face of the element.

Advantageously, in order to accelerate cooling of the product contained in a given cavity after implementing the corresponding heating means, forced cooling means are provided for this product, such as a refrigerating fluid circuit.

According to an advantageous development of the invention, at least one temperature sensor is used to measure the overall temperature. The control means are then sensitive to a signal delivered by this sensor for overall adjustment of the piloting of the heating means, meaning in particular the idle current and the overall activation current of the heating means when the latter are constituted by heating organs piloted by an electric current.

As a variant, a local temperature sensor can measure the temperature of each means of heating. The control means are then sensitive to a signal delivered by each of the sensors for local adjustment of the piloting of each heating means, meaning in particular the idle current and the individual activation current of each of the heating means, when the latter are constituted by heating organs piloted by an electric current.

In another embodiment variant, the control means use the measurement of the current crossing the heating organs and the voltage at the terminals of these organs to estimate their temperature and to adjust an idle current and an activation current for the heating organs.

BRIEF DESCRIPTION OF THE DRAWINGS

Now, as non-limiting examples, different embodiments of the invention will be described, with reference to the attached drawings, in which.

DETAILED DESCRIPTION OF SEVERAL PREFERRED EMBODIMENTS ACCORDING TO THE INVENTION

Figure 1:
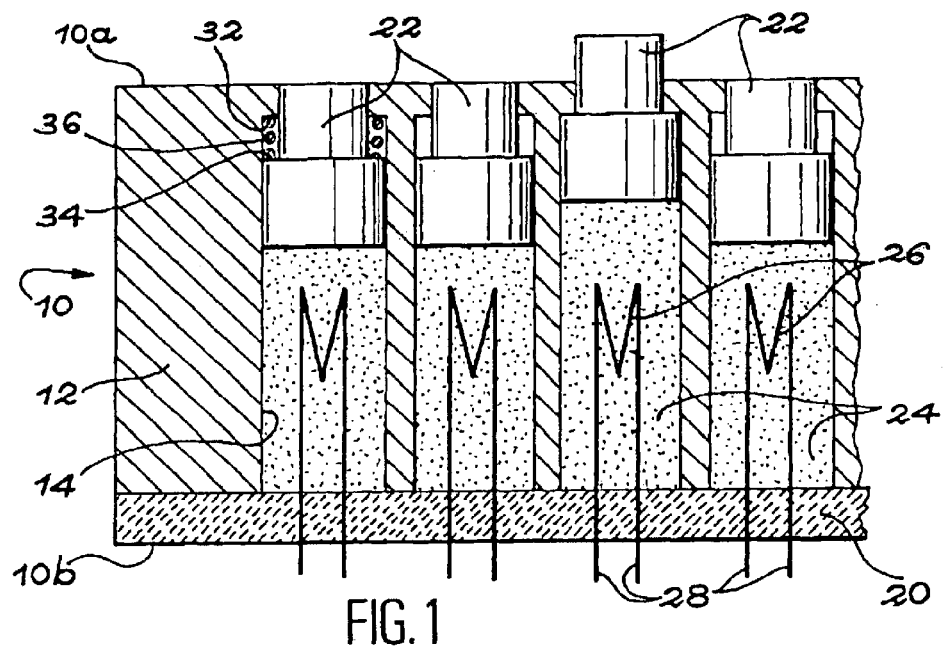
FIG. 1 is a cross-section, on a large scale, showing diagrammatically a part of an element in relief illustrating a first embodiment of the invention.

FIG. 1 shows diagrammatically a part of an element with evolutive superficial relief according to a first embodiment according to the invention. To make it easier to understand, the thickness of this element in panel form has deliberately been very accentuated in the figure. In practice, this thickness is, for example, closely equal to 1 or 2 mm.

The element 10 has a front face 10a, with evolutive relief, intended to be turned outwards, and a back face 10b.

The element 10 shown in FIG. 1 comprises a rigid plate 12, made for example in metal or any other suitable material. The plate 12 shown in FIG. 1 is plane; however, a plate of different form (bulging, hollow etc.) can be used depending on the application envisaged, without extending beyond the framework of the invention.

Perforations 14 are made in the plate 12, following a regular pattern, so as to form a matrix of perforations in said plate. The pattern formed by the matrix of perforations 14 can be a pattern with square, triangular or other shaped pitch, without extending beyond the framework of the invention.

The perforations 14 are generally all of the same dimension and have, for example, although evidently non-limiting, a circular cross-section. All the perforations 14 open onto a front face and onto a back face of the plate 12. The front face of the plate 12 forms the front face 10a of the element 10.

The element 10 further comprises a rear rigid wall 20, applied and fixed in sealed manner against the back face 18 of the plate 12. In practice, the rear wall 20 can be constituted, for example, either of a resin closing the corresponding extremities of the perforations 14, or of a film of a material such as those constituting integrated circuits, advantageously with high thermal conductivity. The wall 20 is fixed to the plate 12 by any appropriate means ensuring the seal of the perforations 14 (gluing, etc.).

In the embodiment of the invention shown in FIG. 1, a mobile organ such as a piston 22 is housed in sliding fashion in the part of each of the perforations 14 opening onto the front face 10a. More precisely, each of the mobile organs 22 hermetically closes the corresponding perforation 14 of the front face side 10a.

Each of the perforations 14 thus defines a cavity 24 internally, hermetically closed, between the rear wall 20 and the mobile organ 22. This cavity 24 is filled with a product capable of changing volume when a predetermined temperature threshold is crossed. In particular, this product can be constituted by a wax which is in the solid state at ambient temperature and in the liquid state when the temperature rises above a predetermined temperature threshold, and whose volume automatically increases when it changes phase from the sold state to the liquid state, and vice versa. Such a wax is comparable to the waxes implemented in existing wax actuators used in certain household appliances. However, more generally, the product contained in each of the cavities 24 can be constituted by any other product with the required characteristics, such as a polymer, a shape memory alloy, etc.

When the product contained in the cavities 24 is a wax, the choice of the latter makes it possible to adjust at will the temperature threshold at which the volume change takes place, together with the amplitude of this volume change. This amplitude is generally comprised between 10 and 15%, but in certain cases can exceed 20%.

In order to ensure that the threshold temperature for the product contained in the cavities 24 is crossed, a heating means 26 for this product is placed in each of said cavities. In the embodiment shown more precisely in FIG. 1, this heating means 26 is a heating organ of the resistive wire type, piloted by an electric current applied to the heating organ by electrical conductors 28. These electrical conductors 28 cross the rigid rear wall 20 of the element 10. They form a matrix making it possible for each of the individual heating organs 26 to be supplied separately, from a control unit 30, as shown diagrammatically in FIG. 4.

When the element 10 is not being used, there is no electrical supply to any of the heating organs 26. The product contained in the cavities 24 then returns to its original state corresponding, for example, to its solid phase in the case of a wax. In these conditions, the volume of product contained in each of the cavities 24 is such that the extremities of the mobile organs turned towards the front face 10a are flush with this face. In this initial state, the front face 10a thus has no relief.

When one or several heating organs 26 are supplied electrically by the control unit 30, these organs 26 heat the product contained in the corresponding cavities 24, in such a way that this product crosses the temperature threshold at which it changes state. In the case where the product is a wax, it passes into the liquid phase. This change of state has the consequence of significantly increasing its volume. This results in a displacement of the corresponding mobile organ(s) 22 towards the front face 10a of the element. The mobile organ(s) 22 concerned then protrude beyond this front face 10a, for a predetermined distance (for example, about 200 microns), as shown in FIG. 1 for the second organ from the right.

The arrangement described thus makes it possible to make the relief of the front face 10a of the element evolve at will, in order to re-transcribe some sort of information in relief on this face. As already noted, this information can, in particular, be used in tactile manner by visually handicapped persons, for example for reading in Braille, for acting as a computer interface, or by sighted persons within the framework of electronic commerce applications.

The information re-transcribed in relief on the front face 10a of the element can also be of visual nature. In this case, the product and the different parts such as the plate 12, the mobile organs 22 and the rear wall 20 can be produced in transparent materials. Thus a transparent screen with evolutive relief is produced, able to be placed over a traditional visualisation screen.

In order to improve the response time of the element 10, the individual return of each of the mobile organs 22 to its original state can be accelerated by associating a recall means to each of these organs, such as a compression spring 36 interposed between the opposite shoulders 32 and 34 formed respectively in each of the perforations 14 and on each of the mobile organs 22. For simplification, the spring 36 has only been shown in the left-hand perforation 14 in FIG. 1.

Also, in order to reduce the response time of the element, advantageously one lowers the thermal inertia slowing the return of the mobile organs 22 to their original state when the heating organs 26 are no longer supplied. Thus, the rear wall 20 is made in a material with high thermal conductivity, as mentioned above.

In order to further improve the evacuation of the heat produced by the heating organs 26, when they are no longer being supplied, forced cooling means can be integrated with the rear wall 20, associated individually with each of the heating organs 26. These forced cooling means are, for example, by fluid circulation. They are then connected to a cooling system (not shown) outside the element.

Although the mobile organs 22 are shown in the form of stepped pistons in FIG. 1, these organs can also be constituted of cylindrical pistons of uniform cross-section, without extending beyond the framework of the invention.

Figure 2:
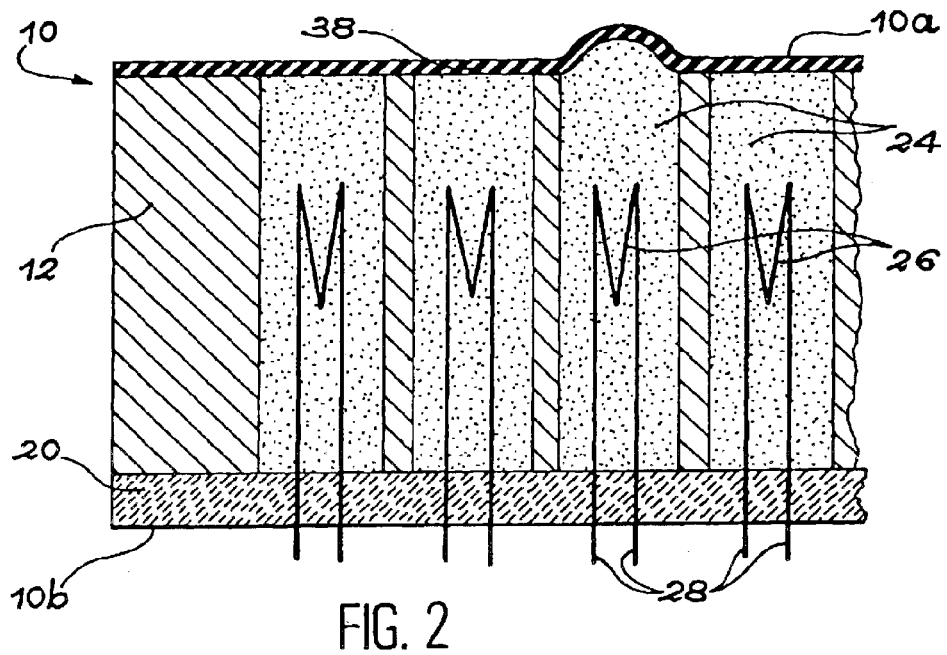
FIG. 2 is a view comparable to FIG. 1, showing a variant of the first embodiment of the invention.

In an embodiment variant shown in FIG. 2, the mobile organs 22 are suppressed and replaced by a single elastic membrane 38, covering the whole of the front face of the plate 12. The elastic membrane 38 is then fixed in sealed fashion onto the plate 12, for example by gluing, so as to close the perforations 14 hermetically. In this case, the front face 10a of the element 10 is constituted by the face of the elastic membrane 38 turned outwards.

In this embodiment variant, the change in volume of the product contained in the cavities 24 results in a deformation of the elastic membrane 38 outwards from the element 10, in front of the concerned perforations 14, as shown for the second perforation from the right in FIG. 2.

The material constituting the membrane 38 is chosen so as to be sufficiently elastic, or even super-elastic, to be able to return the product contained in the cavities 24 back to the initial position, during cooling.

This embodiment variant is preferable to the preceding variant, because of its implementation simplicity.

Figure 3:
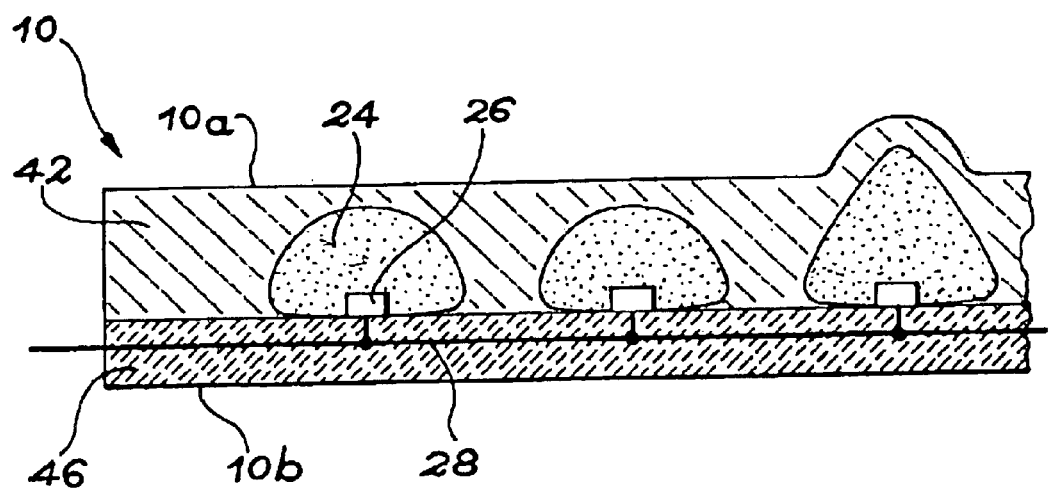
FIG. 3 is cross-section comparable to FIGS. 1 and 2, showing a second embodiment of the invention.

In a second embodiment according to the invention, shown in FIG. 3, the cavities 24 containing the product able to change in volume when crossing a predetermined temperature threshold are made directly in an elastic membrane 42. In this case, the cavities 24 do not open out onto the front face of the elastic membrane 42, forming the front face 10a of the element 10. Consequently, as in the embodiment variant of FIG. 2, each cavity 24 is separated from the front face 10a of the element by a deformable organ, constituted in this case by a part of the membrane 42.

The back face of the elastic membrane 42 is fixed in sealed fashion, for example by gluing, onto a rigid substrate 46 on which the back face 10b of the element 10 is formed. The rigid substrate 46 carries, on its face turned towards the elastic membrane 42, heating means 26 received individually in each of the cavities 24. Advantageously, these heating means 26 are constituted by heating organs piloted by an electric current. In this case, the electric current can in particular be directed separately to each of the individual heating organs 26 by electrical conductors 28 implanted directly in the rigid substrate 46. This can, for example, be in the form of a printed circuit.

Figure 4:
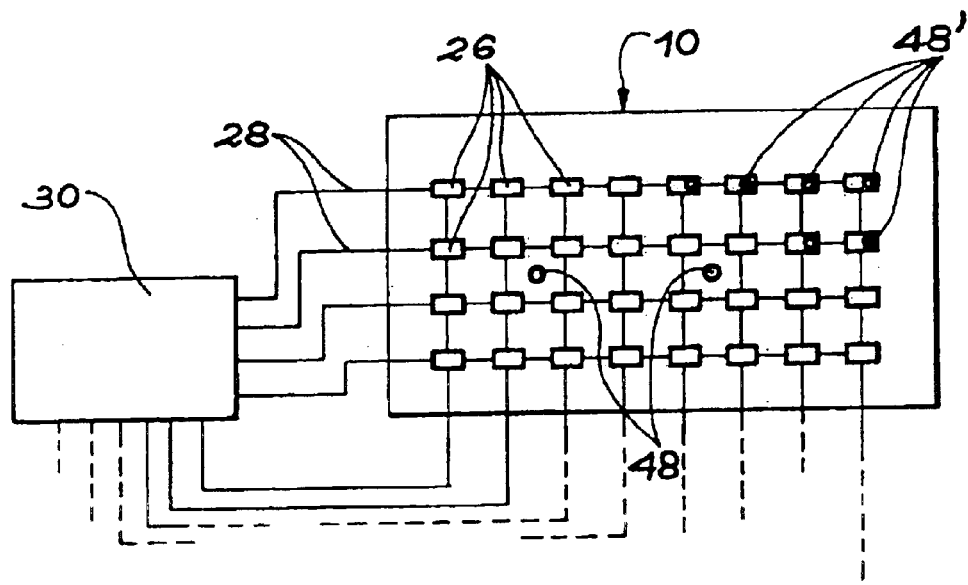
FIG. 4 shows diagrammatically the matrix control of the heating organs used in the elements of FIGS. 1 to 3.

The heating organs 26 together with the electrical conductors 28 are arranged in matrix fashion, in the form shown in FIG. 4, as in the case of the first embodiment described and its variant.

In the embodiment of FIG. 3, the cavities 24 have a non-cylindrical shape, comparable to a bubble. This shape is determined so as to produce as great a deformation as possible of the deformable organs of the membrane 42, separating the cavities 24 from the front face 44, during the change in volume of the product.

The embodiment shown in FIG. 3 is preferable to preceding embodiments, in that the production of the element is even simpler than in the variant of FIG. 2.

In all embodiments, means can advantageously be envisaged to limit temperature swings in the active cells constituted by the cavities 24 filled with product on either side of the temperature threshold corresponding to the phase change of said product, taking hysteresis phenomena into account. These limitation means are aimed at ensuring the system with adequate dynamics, taking into account the fact that temperature swings are very dependent on the ambient temperature and the overall temperature of the complete system, which also depends on its utilisation.

Thus the means for limiting temperature swings of the active cells comprise means for adjusting the temperature using the signals delivered by one or several temperature sensors.

According to a first possible arrangement, one or several temperature sensors 48 (FIG. 4) measure the overall temperature of the element 10. The command unit 30 is then sensitive to the signals delivered by each temperature sensor 48 for global adjustment of the piloting of the heating means 26. In the case where these heating means are constituted by heating organs piloted by an electric current as described above, the control unit 30 modulates the idle current and the activation current sent to the heating organs, in function of the overall temperature measured by the sensor(s) 48 integrated into the element 10.

According to a second possible arrangement, a temperature sensor 48' (FIG. 4) is integrated locally into each of the cells 24, and in particular into each of the heating means 26. The signals delivered by the sensors 48' are transmitted to the control unit 30 and the latter adjusts the temperature locally by adjusting the piloting of each heating means 26 locally. In the case described where the heating means 26 are heating organs piloted by an electric current, the control unit 30 locally modulates the idle current and the activation current sent to this heating organ.

In another embodiment variant (not shown) the temperature sensors are suppressed and the temperature is deduced from measurement of the current crossing the heating organ and from the voltage at the terminals of this organ. On the base of this information, the control unit 30 modulates the idle current and the activation current sent to the heating organs.

It should be noted that such means for temperature adjustment can advantageously be associated with active cooling means such as those described above, so as to further improve the diffusion of heat towards the outside the element. Whatsoever the embodiment of the element according to the invention, this can be produced at very low cost. Furthermore, the size of the element is not limited and it is possible to produce screens in relief of large dimensions.

Furthermore, the activation temperature adjustment can be accessible to the user, thus enabling this temperature to be adjusted in function of the utilisation conditions.

Moreover, the technology proposed is very suitable for miniaturisation. In particular, the element can be produced by micro-machining techniques. It is then possible to obtain very high definition for representation of textured surfaces.

Finally, as noted concerning the first embodiment described with reference to FIG. 1, the element according to the invention makes it possible to produce transparent screens with evolutive relief able to be superposed on traditional visualisation screens. This possibility concerns all the possible embodiments of the invention, on condition that the materials and the product used are transparent.

What is claimed is:

1. Element with a front face with evolutive relief, said element comprising individual means for modifying the relief of the front face, arranged according to a regular pattern and control means capable of piloting separately all the individual means for modification of the relief of the element, wherein the individual modification means of the relief comprise sealed cavities filled with a product able to change volume when a predetermined temperature threshold is crossed, a deformable or mobile organ separating each cavity of the front face, and individual heating means for the product contained in each cavity, where the heating means are heating organs piloted by an electric current and the control means are connected to these heating organs by electrical conductors with a matrix layout.

2. Element according to claim 1, wherein the electrical conductors cross a rear wall of the element.

3. Element according to claim 1, wherein the electrical conductors are supported by a substrate on which a back face of the element is formed.

4. Element according to claim 1, wherein the cavities are defined by perforations formed in a plate.

5. Element according to claim 4, wherein the mobile organ comprises a piston able to slide in each perforation, on the side of the front face of the element, in such a way as to close the perforations hermetically.

6. Element according to claim 5, wherein a recall means is associated with each piston, to return it automatically to an idle position.

7. Element according to claim 4, wherein the deformable or mobile organ comprises an elastic membrane covering said plate on the side of the front face of the element, so as to close the perforations hermetically.

8. Element according to claim 1, wherein the cavities are integrally defined within an elastic membrane with one front face forming the front face of the element.

9. Element according to claim 1, wherein at least one temperature sensor measures the overall or local temperature of the element and the control means are sensitive to a signal delivered by each sensor to adjust, overall or locally, piloting of the heating means.

10. Element according to claim 9, wherein the control means adjust, overall or locally, an idle current and an activation current for the heating organs.

11. Element according to claim 1, wherein the control means use the measurement of the current crossing the heating organs and the voltage at the terminals of these organs to estimate their temperature and to adjust an idle current and an activation current for the heating organs.

* * * * *